United States Patent

Begin et al.

(10) Patent No.: US 9,494,189 B2
(45) Date of Patent: Nov. 15, 2016

(54) TURBOCHARGER BEARING HOUSING OIL GROOVE

(71) Applicant: GM GLOBAL TECHNOLOGY OPERATIONS LLC, Detroit, MI (US)

(72) Inventors: Louis P. Begin, Rochester, MI (US); Dingfeng Deng, Auburn Hills, MI (US); Ran Wu, Auburn Hills, MI (US); Fanghui Shi, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 14 days.

(21) Appl. No.: 14/503,528

(22) Filed: Oct. 1, 2014

(65) Prior Publication Data

US 2015/0285301 A1 Oct. 8, 2015

Related U.S. Application Data

(60) Provisional application No. 61/975,368, filed on Apr. 4, 2014.

(51) Int. Cl.
*F16C 33/10* (2006.01)
*F04D 29/056* (2006.01)
*F02M 25/07* (2006.01)
(Continued)

(52) U.S. Cl.
CPC ............ *F16C 17/18* (2013.01); *F01D 25/166* (2013.01); *F01D 25/18* (2013.01); *F04D 29/057* (2013.01); *F04D 29/063* (2013.01); *F16C 33/1065* (2013.01); *F05D 2220/40* (2013.01); *F05D 2250/13* (2013.01); *F05D 2260/607* (2013.01); *F16C 17/02* (2013.01); *F16C 33/105* (2013.01); *F16C 2240/42* (2013.01); *F16C 2360/24* (2013.01)

(58) Field of Classification Search
CPC ... F01M 11/02; F01M 2011/021; F16C 1/24; F16C 33/1085; F16C 33/66; F16C 33/6637; F16C 33/664; F04D 29/063; F04D 29/057; F01D 25/16; F01D 25/162; F01D 25/164; F01D 25/18; F01D 25/183; F01D 25/20
USPC .................. 123/196 R, 559.1; 384/129, 155
See application file for complete search history.

(56) References Cited

U.S. PATENT DOCUMENTS 4,370,106 A * 1/1983 Lauterbach ............. F01D 25/16
 384/126
4,427,309 A * 1/1984 Blake .................... F01D 25/166
 384/286

(Continued)

*Primary Examiner* — Lindsay Low
*Assistant Examiner* — Grant Moubry
(74) *Attorney, Agent, or Firm* — Quinn Law Group, PLLC

(57) ABSTRACT

A turbocharger for an internal combustion engine includes a bearing housing and a bearing bore defined by the bearing housing. The bearing bore has an annular bearing groove configured to receive a fluid. A journal bearing is disposed within the bore such that the annular bearing groove encircles the journal bearing and feeds the fluid thereto. The turbocharger also includes a rotating assembly having a shaft with a turbine wheel and a compressor wheel. The shaft has a longitudinal axis and is supported by the journal bearing for rotation within the bore about the axis. The annular bearing groove is characterized by a trapezoidal shape in a cross-sectional view of the bearing bore taken along and through the longitudinal axis. The trapezoidal shape is configured to generate Taylor vortices in the fluid for capturing debris carried by the fluid and keeping the debris from being fed to the journal bearing.

16 Claims, 3 Drawing Sheets

(51) Int. Cl.
*F16C 17/18* (2006.01)
*F04D 29/057* (2006.01)
*F04D 29/063* (2006.01)
*F01D 25/16* (2006.01)
*F01D 25/18* (2006.01)
*F16C 17/02* (2006.01)

(56) References Cited

U.S. PATENT DOCUMENTS

| | | | | |
|---|---|---|---|---|
| 4,789,253 A * | 12/1988 | Perego | ............... | F01D 25/164 384/517 |
| 5,169,242 A * | 12/1992 | Blase | ............... | F01D 25/164 384/107 |
| 5,924,286 A * | 7/1999 | Kapich | ............... | F02B 37/10 123/565 |
| 6,017,184 A * | 1/2000 | Aguilar | ............... | F01D 25/168 415/105 |
| 6,032,466 A * | 3/2000 | Woollenweber | ............... | F01D 25/164 417/407 |
| 6,793,468 B2 * | 9/2004 | Ojima | ............... | F01D 25/166 148/434 |
| 8,628,247 B2 * | 1/2014 | Uesugi | ............... | F01D 25/166 384/397 |
| 8,740,465 B2 * | 6/2014 | McKeirnan, Jr. | ............... | F16C 19/163 384/517 |
| 8,991,175 B2 * | 3/2015 | Fonville | ............... | F01D 25/168 184/6.11 |
| 2007/0003175 A1 * | 1/2007 | Petitjean | ............... | F01D 25/16 384/322 |
| 2011/0176907 A1 * | 7/2011 | Groves | ............... | F01D 25/166 415/1 |
| 2012/0251383 A1 * | 10/2012 | Toda | ............... | F01D 25/16 420/482 |
| 2015/0292517 A1 * | 10/2015 | Bucking | ............... | F16C 33/1025 415/116 |

* cited by examiner

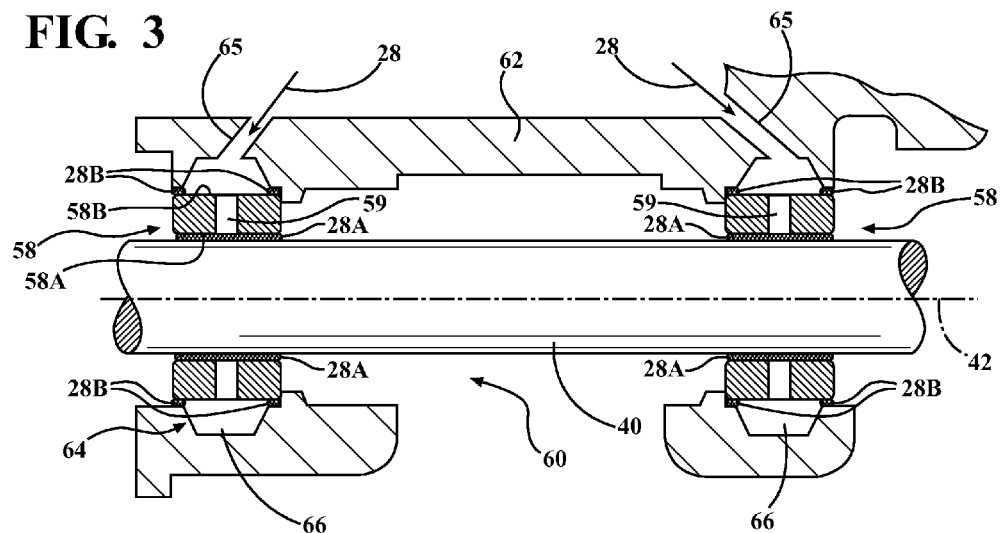
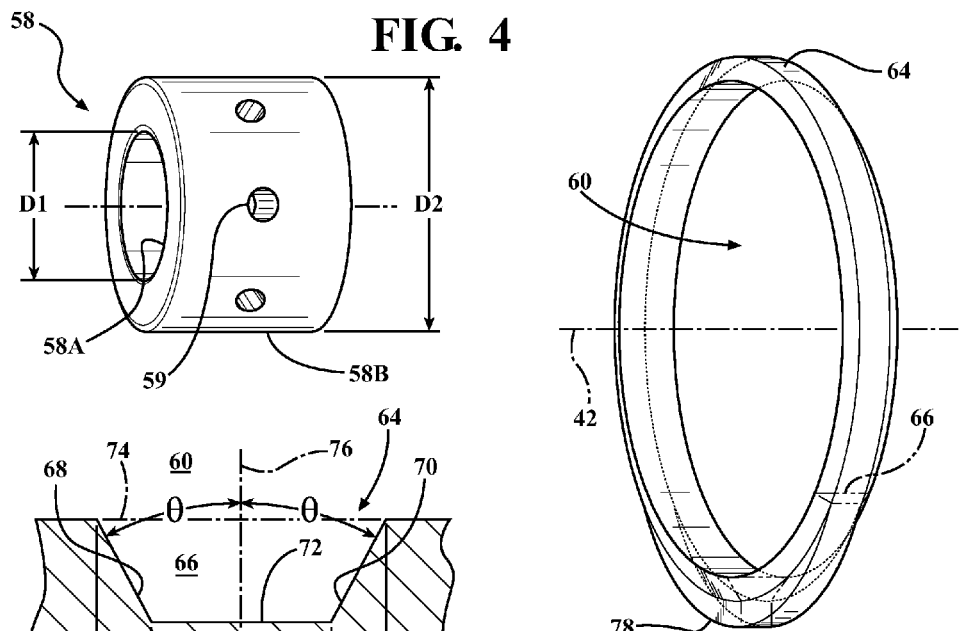

TURBOCHARGER BEARING HOUSING OIL GROOVE

CROSS-REFERENCE TO RELATED APPLICATION(S)

This application claims the benefit of U.S. Provisional Application Ser. No. 61/975,368 filed Apr. 4, 2014, the entire contents of which is hereby incorporated by reference.

TECHNICAL FIELD

The present disclosure relates to an oil groove in a turbocharger bearing housing.

BACKGROUND

Internal combustion engines (ICE) are often called upon to generate considerable levels of power for prolonged periods of time on a dependable basis. Many such ICE assemblies employ a supercharging device, such as an exhaust gas turbine driven turbocharger, to compress the airflow before it enters the intake manifold of the engine in order to increase power and efficiency.

Specifically, a turbocharger is a centrifugal gas compressor that forces more air and, thus, more oxygen into the combustion chambers of the ICE than is otherwise achievable with ambient atmospheric pressure. The additional mass of oxygen-containing air that is forced into the ICE improves the engine's volumetric efficiency, allowing it to burn more fuel in a given cycle, and thereby produce more power.

A typical turbocharger employs a central shaft that transmits rotational motion between an exhaust-driven turbine wheel and an air compressor wheel. Such a shaft is generally supported inside a bearing housing by thrust and journal bearings which are lubricated and cooled by engine oil and frequently receive additional cooling from specially formulated engine coolant.

SUMMARY

One embodiment of the disclosure is directed to a turbocharger for an internal combustion engine that includes a combustion chamber. The turbocharger includes a bearing housing. A bearing bore is defined by the bearing housing and has an annular bearing groove configured to receive a fluid. A journal bearing is disposed within the bore such that the annular bearing groove encircles the journal bearing and feeds the fluid thereto. The turbocharger also includes a rotating assembly having a shaft with a turbine wheel that is configured to be driven by post-combustion gasses emitted by the combustion chamber and a compressor wheel that is configured to pressurize the airflow for delivery to the combustion chamber. The shaft has a longitudinal axis and is supported by the journal bearing for rotation within the bore about the longitudinal axis. The annular bearing groove is characterized by a trapezoidal shape in a cross-sectional view of the bearing bore taken along and through the longitudinal axis. The trapezoidal shape of the bearing groove is configured to generate Taylor vortices in the fluid for capturing debris carried by the fluid and keeping the debris from being fed from the annular bearing groove to the journal bearing.

The journal bearing may be configured as a fully-floating bearing. In such a case, the fluid fed to the journal bearing may form a first fluid film between the bearing bore and the journal bearing, and may also form a second fluid film between the journal bearing and the shaft.

The engine may include a fluid pump configured to pressurize the fluid. Such pressurized fluid may be directed to the annular bearing groove to lubricate the journal bearing and generate the first and second fluid films.

The bearing bore may also include a wedge groove incorporated into the annular bearing groove. The wedge groove may be configured, i.e., shaped and positioned, to use gravity for trapping the debris when the fluid pump stops pressurizing the fluid.

The journal bearing may include a first surface defined by an inner diameter, a second surface defined by an outer diameter, and a passage that connects the first and second surfaces. In such a case, the annular bearing groove may be positioned to align with and feed the fluid through the passage.

The journal bearing may include a plurality of such passages, and the annular bearing groove may be positioned to align with each of the plurality of passages and feed the fluid therethrough.

The turbocharger may include a plurality of such journal bearings and a plurality of such annular bearing grooves. In such a case, each annular bearing groove may encircle a respective journal bearing.

Each journal bearing may be configured as a brass bushing.

The bearing housing may be formed from cast iron. Furthermore, each annular bearing groove may be either machined or cast into the bearing housing.

Another embodiment of the present disclosure is directed to an internal combustion engine having the turbocharger as described above.

The above features and advantages, and other features and advantages of the present disclosure, will be readily apparent from the following detailed description of the embodiment(s) and best mode(s) for carrying out the described disclosure when taken in connection with the accompanying drawings and appended claims.

BRIEF DESCRIPTION OF THE DRAWINGS

FIG. 3 is a schematic close-up cross-sectional view of the bearing housing shown in FIG. 2, specifically showing details of a journal bearing, and an annular bearing groove.

FIG. 4 is a perspective view of the journal bearing shown in FIGS. 2 and 3.

FIG. 5 is a schematic cross-sectional view of the annular bearing groove shown in FIG. 3.

FIG. 6 is a close-up perspective view of the annular bearing groove shown in FIGS. 3 and 5, along with an incorporated wedge groove for trapping oil-borne debris.

DETAILED DESCRIPTION

Figure 1:
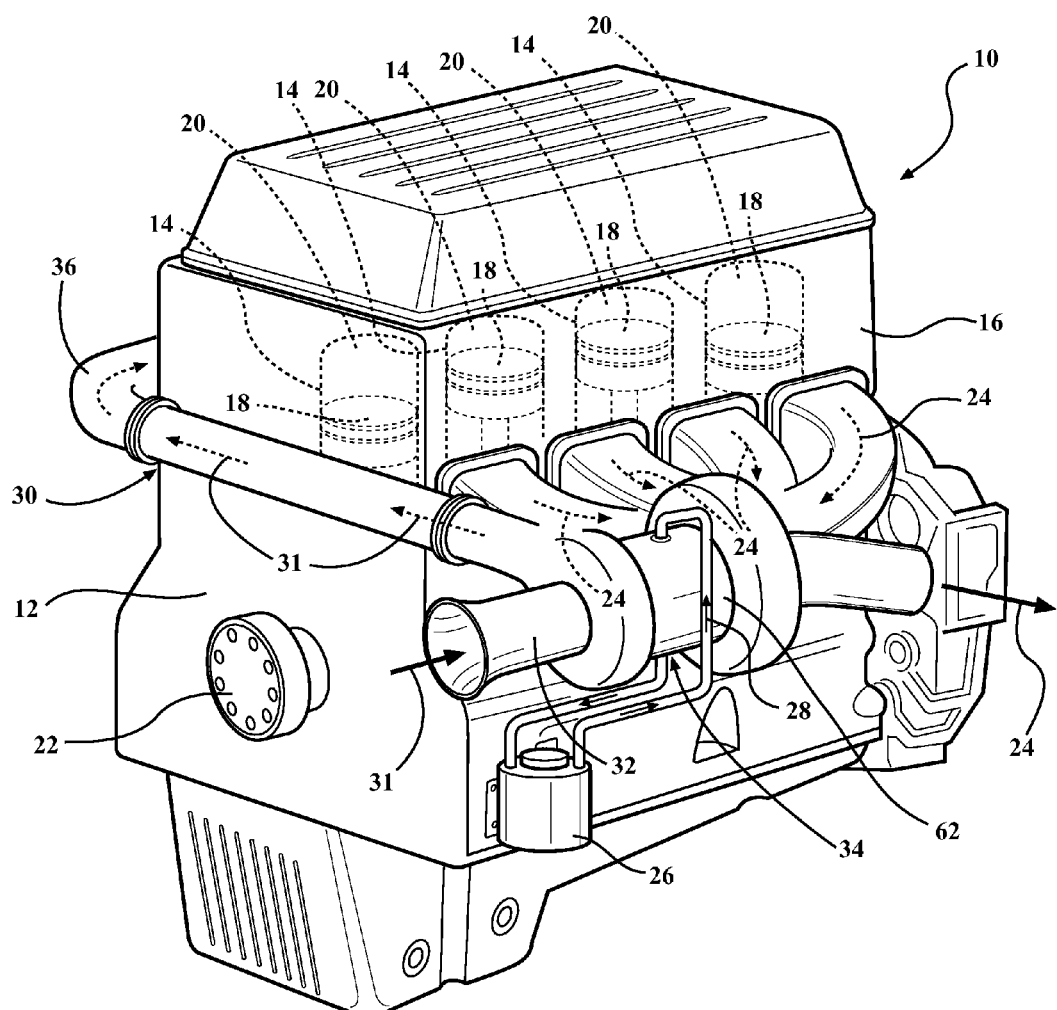
FIG. 1 is a schematic perspective view of an engine with a turbocharger according to the disclosure.

Referring to the drawings wherein like reference numbers correspond to like or similar components throughout the several figures, FIG. 1 illustrates an internal combustion engine 10. The engine 10 also includes an engine or cylinder block 12 with a plurality of cylinders 14 arranged therein. As shown, the engine 10 also includes a cylinder head 16. Each cylinder 14 includes a piston 18 configured to reciprocate therein. Combustion chambers 20 are formed within the cylinders 14 between the bottom surface of the cylinder head 16 and the tops of the pistons 18. As known by those skilled in the art, combustion chambers 20 are configured to receive a fuel-air mixture for subsequent combustion therein.

As shown, the engine 10 also includes a crankshaft 22 configured to rotate within the cylinder block 12. The crankshaft 22 is rotated by the pistons 18 as a result of an appropriately proportioned fuel-air mixture being burned in the combustion chambers 20. After the air-fuel mixture is burned inside a specific combustion chamber 20, the reciprocating motion of a particular piston 18 serves to exhaust post-combustion gases 24 from the respective cylinder 14. The engine 10 also includes a fluid pump 26. The fluid pump 26 is configured to supply pressurized fluid or engine oil 28 to various bearings, such as that of the crankshaft 22. The pump 26 may be driven directly by the engine 10, or by an electric motor (not shown).

The engine 10 additionally includes an induction system 30 configured to channel airflow 31 from the ambient to the cylinders 14. The induction system 30 includes an intake air duct 32, a turbocharger 34, and an intake manifold 36. Although not shown, the induction system 30 may additionally include an air filter upstream of the turbocharger 34 for removing foreign particles and other airborne debris from the airflow 31. The intake air duct 32 is configured to channel the airflow 31 from the ambient to the turbocharger 34, while the turbocharger is configured to pressurize the received airflow, and discharge the pressurized airflow to the intake manifold 36. The intake manifold 36 in turn distributes the previously pressurized airflow 31 to the cylinders 14 for mixing with an appropriate amount of fuel and subsequent combustion of the resultant fuel-air mixture. While the present disclosure concentrates on the internal combustion engine 10 having a reciprocating configuration, other engine designs, such as a rotary engine that has combustion chambers 20, but not reciprocating pistons, are also envisioned.

Figure 2:
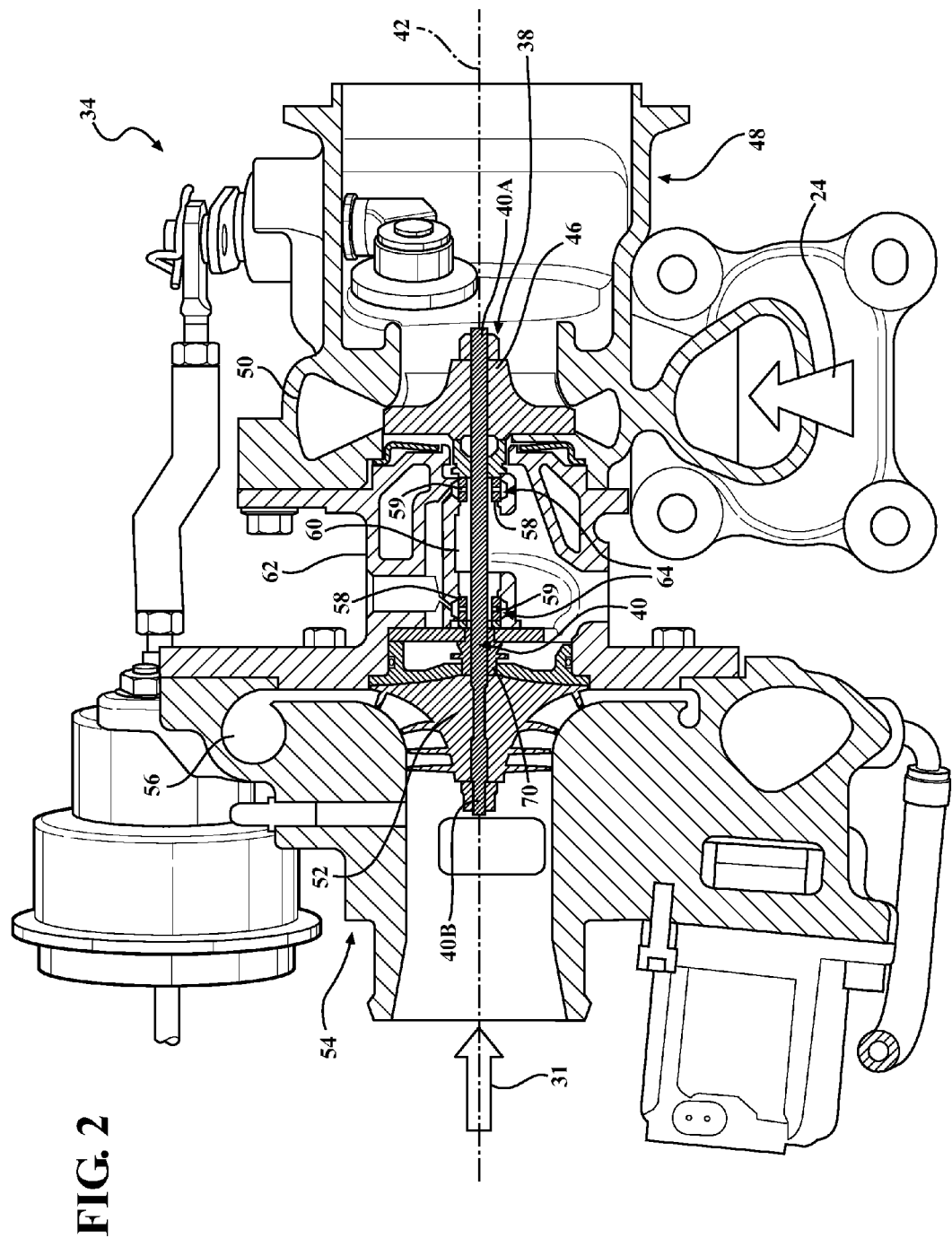
FIG. 2 is a schematic cross-sectional view of the turbocharger shown in FIG. 1, wherein the turbocharger includes a rotating assembly and journal bearings for supporting the rotating assembly inside a bearing housing.

As shown in FIG. 2, the turbocharger 34 includes a rotating assembly 38. The rotating assembly 38 includes a shaft 40 that is typically formed from steel and is defined by a first end 40A and a distal second end 40B. A turbine wheel 46 is mounted on the shaft 40 proximate to the first end 40A and configured to be rotated along with the shaft 40 about a longitudinal axis 42 of the shaft by post-combustion gasses 24 emitted from the cylinders 14. The turbine wheel 46 is disposed inside a turbine housing 48 that includes a volute or scroll 50. The scroll 50 receives the post-combustion exhaust gases 24 and directs the exhaust gases to the turbine wheel 46. The scroll 50 is configured to achieve specific performance characteristics, such as efficiency and response, of the turbocharger 34.

As further shown in FIG. 2, the turbocharger 34 also includes a compressor wheel 52 mounted on the shaft 40 proximate to the second end 40B. The compressor wheel 52 is configured to pressurize the airflow 31 being received from the ambient for eventual delivery to the cylinders 14. The compressor wheel 52 is disposed inside a compressor cover 54 that includes a volute or scroll 56. The scroll 56 receives the airflow 31 and directs the airflow to the compressor wheel 52. The scroll 56 is configured to achieve specific performance characteristics, such as peak airflow and efficiency of the turbocharger 34. Accordingly, rotation is imparted to the shaft 40 by the post-combustion exhaust gases 24 energizing the turbine wheel 46, and is in turn communicated to the compressor wheel 52 owing to the compressor wheel being fixed to the shaft. As understood by those skilled in the art, the variable flow and force of the post-combustion exhaust gases 24 influences the amount of boost pressure that may be generated by the compressor wheel 52 throughout the operating range of the engine 10.

With continued reference to FIG. 2 and as also shown in a close-up view in FIG. 3, the shaft 40 is supported for rotation about the axis 42 via journal bearings 58. As shown in FIG. 4, each journal bearing 58 includes a first surface 58A that is defined by an inner diameter D1 and a second surface 58B defined by an outer diameter D2. As shown in FIGS. 2-4, each journal bearing 58 also includes a plurality of passages 59 that fluidly connects the first surface 58A and the second surface 58B. The journal bearings 58 are positioned in a bearing bore 60 of a bearing housing 62 and are lubricated and cooled by the supply of pressurized engine oil 28 supplied via the pump 26. The bearing housing 62 may be formed from a robust material such as cast iron in order to provide dimensional stability to the bearing bore 60 under elevated temperatures and loads during operation of the turbocharger 34. The journal bearing 58 is configured to control radial motion and vibrations of the shaft 40.

As shown in FIGS. 2-3, the journal bearings 58 have a fully-floating design that is typically formed from a relatively soft metal, for example brass or bronze, such that the majority of wear from any contact between the shaft 40 and the journal bearings would take place on the bearings. As per its fully-floating design, each journal bearing 58 is generally restrained from shifting along the axis 42, but is provided with freedom to shift or float radially within the bearing bore 60, i.e., in a direction that is transverse to the axis 42. Such provision to shift radially, allows each journal bearing 58 to take up any radial displacement of the shaft 40, which may develop as a result of an imbalance in the shaft, the turbine wheel 46, and/or the compressor wheel 52. Additionally, the fully-floating design of the journal bearings 58 permits the journal bearings to rotate in the bearing bore 60 and thereby reduce the likelihood of localized wear in the journal bearings.

During operation of the turbocharger 34, the pressurized engine oil 28 from the pump 26 is delivered to the bearing housing 62 and fed to the journal bearings 58. The pressurized oil 28 lubricates the bearings and generates a first fluid or oil film 28A between the first surface 58A of the journal bearing 58 and the shaft 40, and a second fluid or oil film 28B between the bearing bore 60 and the second surface 58B of the journal bearing (shown in FIG. 3). The first and second oil films 28A, 28B provide hydro-dynamic damping layers for supporting the rotating shaft 40 during operation of the turbocharger 34, thus reducing the likelihood of direct physical contact between the housing 62, the journal bearings 58, and the shaft 40 during high speed operation of the turbocharger 34. In turn, such reduction of direct contact between the housing 62, the journal bearings 58, and the shaft 40 serves to extend useful life of the journal bearings, as well as reduce frictional losses, noise, and vibration, and enhance response of the turbocharger 34 during operation thereof.

As shown in FIGS. 2, 3, 5 and 6, the bearing bore 60 includes annular bearing grooves 64 configured to receive the pressurized engine oil 28 from the fluid pump 26 via fluid passages 65 arranged in the bearing housing 62. Each journal bearing 58 is disposed within the bearing bore 60 such that one annular bearing groove 64 encircles a respective journal bearing and feeds the pressurized oil 28 thereto. Each annular bearing groove 64 is positioned to align with and feed the pressurized oil 28 to and through the passages 59 in the respective journal bearing 58 to lubricate the shaft 40. As shown in FIG. 3, the annular bearing groove 64 is characterized by a trapezoidal shape 66 in a cross-sectional view of the bearing bore 60 taken along and through the longitudinal axis 42. The bearing groove 64 is configured to generate "Taylor vortices" in the pressurized oil 28 for capturing any debris that may be carried by the oil and keeping such debris from being fed from the annular bearing groove 64 to the respective journal bearing 58. As shown in FIG. 5, the trapezoidal shape 66 is defined by slanted legs 68 and 70, and by parallel bases 72 and 74 that have respective lengths L1 and L2. The trapezoidal shape 66 provides an enhanced formation of "Taylor vortices" in the pressurized oil 28. Although the legs 68 and 70 of the trapezoidal shape 66 are not parallel, they may be arranged at an equivalent angle θ relative to a plane 76 that is transverse to the axis 42. Additionally, as shown, the length L1 of the base 72 that constitutes a surface of the bearing housing 62 is shorter than the length L2 of the base 74 that constitutes an opening of the bearing groove 64 to the journal bearing 58.

Alternatively, the annular bearing groove 64 may have a generally rectangular or semi-circular shape in the cross-sectional view of the bearing bore 60 taken along and through the longitudinal axis 42 to generate at least a measure of "Taylor vortices" in the pressurized oil 28 and capture oil-borne debris (not shown). The above-noted generally rectangular shape may include beveled corners either at some or all locations where sides of the rectangle converge. Although a rectangular or a semi-circular shape of the annular bearing groove 64 may generate a smaller measure of "Taylor vortices" in the pressurized oil 28 than the trapezoidal shape 66, such alternative bearing groove shapes may be sufficiently effective in keeping oil-borne debris from being fed to the respective journal bearing 58 in particular applications of the turbocharger 34.

Hydrodynamic stability of a viscous fluid flow confined in the gap between two rotating cylinders, such as between the journal bearing 58 and the bearing bore 60 or between the shaft 40 and the journal bearing 58, is subject to the angular velocity of the fluid flow, and is known as "Taylor-Couette" flow. For low angular velocities, measured by the Reynolds number Re, the fluid flow is steady and purely azimuthal, i.e., in the same angular direction relative to center of rotation. As the angular velocity of the inner cylinder is increased above a certain threshold, fluid flow becomes unstable and a secondary steady state flow pattern characterized by axisymmetric toroidal vortices stacked one on top of the other form in flow. The fluid flow with thus formed axisymmetric toroidal vortices in the gap between two rotating cylinders is known in the field of fluid dynamics as the Taylor vortex flow, or simply "Taylor vortices". As the angular speed of the cylinder is increased further, the fluid flow will undergo a progression of instabilities. At larger Reynolds numbers the fluid flow will initially transition from the Taylor vortex flow to unsteady "wavy vortex", and subsequently will experience an onset of turbulence.

Through computational modeling and empirical testing it has been determined that the trapezoidal shape 66 of the annular bearing groove 64 is effective in generating or inducing "Taylor vortices" in the pressurized oil 28 at operating speeds of the turbocharger 34, which can reach 200K revolutions per minute (RPM). Once the Taylor vortices have formed in the oil flow in the gap between the journal bearing 58 and the bearing bore 60, the vortices tend to capture debris particles that are sometimes present in the pressurized oil 28 and keep such particles from becoming lodged against the second surface 58B of the journal bearing 58. As a result, the formed "Taylor vortices" are intended to reduce the likelihood of debris particles becoming embedded in the relatively soft material of journal bearings 58, penetrating the second oil film 28B, and causing damage to the second surface 58B.

As shown in FIG. 6, the bearing bore 60 may include a wedge groove 78. As shown, the wedge groove 78 is incorporated into or joined with the lower portion of the annular bearing groove 64. Consequently, each wedge groove 78 forms a localized sump in the bearing bore 60 under the respective journal bearing 58. The wedge groove 78 may be either machined or cast into the bearing bore 60 at the lower portion of the respective annular bearing groove 64. When oil 28 is no longer pressurized, because of the shape and positioning of the wedge grooves 78, each wedge groove can rely on gravity to trap debris that was previously caught in the "Taylor vortices". Thus, wedge grooves 78 are configured to trap oil-borne debris via gravity when the fluid pump 26 stops pressurizing the oil 28, such as on shut down of the engine 10.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. An internal combustion engine comprising:
   an engine block defining a combustion chamber configured to receive an air-fuel mixture for combustion therein and configured to exhaust post-combustion gasses therefrom; and
   a turbocharger configured to receive an airflow from an ambient and the post-combustion gasses from the combustion chamber, the turbocharger including:
      a bearing housing;
      a bearing bore defined by the bearing housing and having an annular bearing groove configured to receive a fluid;
      a journal bearing disposed within the bearing bore such that the annular bearing groove encircles the journal bearing and feeds the fluid thereto; and
      a rotating assembly having a shaft with a turbine wheel configured to be driven by the post-combustion gasses and a compressor wheel configured to pressurize the airflow for delivery to the combustion chamber;
   wherein:
      the journal bearing includes a first surface defined by an inner diameter, a second surface defined by an outer diameter, and a passage that connects the first and second surfaces;
      the shaft has a longitudinal axis and is supported by the journal bearing for rotation within the bearing bore about the longitudinal axis;

the annular bearing groove is characterized by a trapezoidal shape in a cross-sectional view of the bearing bore taken along and through the longitudinal axis and positioned to align with and feed the fluid through the passage; and the trapezoidal shape is configured to generate Taylor vortices in the fluid for capturing debris carried by the fluid and keeping the debris from being fed to the journal bearing.

2. The engine of claim 1, wherein the journal bearing is configured as a fully-floating bearing such that the fluid fed thereto forms a first fluid film between the bearing bore and the journal bearing and a second fluid film between the journal bearing and the shaft.

3. The engine of claim 2, further comprising a fluid pump configured to pressurize the fluid, wherein the pressurized fluid is directed to the annular bearing groove to lubricate the journal bearing and generate the first and second fluid films.

4. The engine of claim 3, wherein the bearing bore includes a wedge groove incorporated into the annular bearing groove and configured to use gravity to trap the debris when the fluid pump stops pressurizing the fluid.

5. The engine of claim 1, wherein the passage includes a plurality of passages and the annular bearing groove is positioned to align with each of the plurality of passages and feed the fluid through the plurality of passages.

6. The engine of claim 1, wherein the journal bearing is a plurality of journal bearings and the annular bearing groove is a plurality of annular bearing grooves, and wherein each annular bearing groove encircles a respective journal bearing.

7. The engine of claim 6, wherein the journal bearing is a brass bushing.

8. The engine of claim 7, wherein the annular bearing groove is one of machined and cast into the bearing housing.

9. A turbocharger for an internal combustion engine having a combustion chamber, the turbocharger comprising:
   a bearing housing;
   a bearing bore defined by the bearing housing and having an annular bearing groove configured to receive a fluid;
   a journal bearing disposed within the bearing bore such that the annular bearing groove encircles the journal bearing and feeds the fluid thereto; and
   a rotating assembly having a shaft with a turbine wheel configured to be driven by post-combustion gasses emitted by the combustion chamber and a compressor wheel configured to pressurize the airflow for delivery to the combustion chamber;

wherein:
   the journal bearing includes a first surface defined by an inner diameter, a second surface defined by an outer diameter, and a passage that connects the first and second surfaces;
   the shaft has a longitudinal axis and is supported by the journal bearing for rotation within the bearing bore about the longitudinal axis;
   the annular bearing groove is characterized by a trapezoidal shape in a cross-sectional view of the bearing bore taken along and through the longitudinal axis and positioned to align with and feed the fluid through the passage; and
   the trapezoidal shape is configured to generate Taylor vortices in the fluid for capturing debris carried by the fluid and keeping the debris from being fed to the journal bearing.

10. The turbocharger of claim 9, wherein the journal bearing is configured as a fully-floating bearing such that the fluid fed thereto forms a first fluid film between the bearing bore and the journal bearing and a second fluid film between the journal bearing and the shaft.

11. The turbocharger of claim 10, wherein the engine includes a fluid pump configured to pressurize the fluid, and wherein the pressurized fluid is directed to the annular bearing groove to lubricate the journal bearing and generate the first and second fluid films.

12. The turbocharger of claim 11, wherein the bearing bore includes a wedge groove incorporated into the annular bearing groove and configured to use gravity to trap the debris when the fluid pump stops pressurizing the fluid.

13. The turbocharger of claim 9, wherein the passage includes a plurality of passages and the annular bearing groove is positioned to align with each of the plurality of passages and feed the fluid through the plurality of passages.

14. The turbocharger of claim 9, wherein the journal bearing is a plurality of journal bearings and the annular bearing groove is a plurality of annular bearing grooves, and wherein each annular bearing groove encircles a respective journal bearing.

15. The turbocharger of claim 14, wherein the journal bearing is a brass bushing.

16. The turbocharger of claim 15, wherein the annular bearing groove is one of machined and cast into the bearing housing.

\* \* \* \* \*